United States Patent
Moon et al.

(10) Patent No.: US 9,202,302 B2
(45) Date of Patent: Dec. 1, 2015

(54) GRAPHIC PROCESSING METHOD AND APPARATUS FOR PROCESSING AN IMAGE USING TILE-BASED RENDERING

(71) Applicant: Nexell Co., Ltd., Seongnam-si, Gyeonggi-do (KR)

(72) Inventors: Woong-Ki Moon, Yongin-si (KR); Tae-Won Kang, Yongin-si (KR); Sung-Su Kim, Seongnam-si (KR)

(73) Assignee: NEXELL CO., LTD., Sungnam-Si (KR)

( * ) Notice: Subject to any disclaimer, the term of this patent is extended or adjusted under 35 U.S.C. 154(b) by 261 days.

(21) Appl. No.: 13/646,407

(22) Filed: Oct. 5, 2012

(65) Prior Publication Data

US 2013/0265298 A1   Oct. 10, 2013

(30) Foreign Application Priority Data

Oct. 7, 2011   (KR) .......................... 10 2011 0102329

(51) Int. Cl.
*G06T 15/00*   (2011.01)

(52) U.S. Cl.
CPC ............... *G06T 15/00* (2013.01); *G06T 15/005* (2013.01)

(58) Field of Classification Search
CPC ............................. G06T 15/00; G06T 15/005
See application file for complete search history.

(56) References Cited

U.S. PATENT DOCUMENTS

| | | | |
|---|---|---|---|
| 6,195,463 B1 * | 2/2001 | Kondo et al. | 382/240 |
| 2007/0146378 A1 | 6/2007 | Sorgard et al. | |
| 2008/0192047 A1 * | 8/2008 | Radzikowski et al. | 345/419 |

* cited by examiner

*Primary Examiner* — Kee M Tung
*Assistant Examiner* — Ryan D McCulley
(74) *Attorney, Agent, or Firm* — Stein IP, LLC

(57) ABSTRACT

Provided are graphic processing method and apparatus. The graphic processing method receives an image divided into a plurality of primitives to generate one tree structured display list for a plurality of tiles by connecting the divided primitive with at least one next primitive to be rendered. According to the present invention, since one display list is generated and used for the entire screen or a plurality of tiles, the present invention is efficient in the aspect to a memory usage.

14 Claims, 14 Drawing Sheets a tile      2x2 group of tiles      4x4 group of tiles (a)  (b)  (C)

| mode | offset |
|------|--------|
| 1bit | 7bit   |

GRAPHIC PROCESSING METHOD AND APPARATUS FOR PROCESSING AN IMAGE USING TILE-BASED RENDERING

CROSS-REFERENCE TO RELATED APPLICATIONS

This application claims the priority benefit of Korean Patent Application No. 10-2011-0102329, filed on Oct. 7, 2011 in the Korean Intellectual Property Office, the disclosures of which are incorporated herein by reference.

BACKGROUND OF THE INVENTION

1. Field of the Invention

The present invention relates to a graphic processing method and apparatus, and more particularly, to a graphic processing method and apparatus capable of processing a 3D computer image by using a tile-based rendering.

2. Description of the Related Art

In general, in a tile-based graphic processing apparatus, rendering is performed for each tile. The tile-based rendering has advantages of reducing a storage space of an internal memory of the graphic processing apparatus and a memory bandwidth.

However, in order to perform the rendering in the tile-based graphic processing apparatus, primitive data needs to be repetitively stored every display list for each tile. Accordingly, in the case of large primitive covering a plurality of tiles, sine the primitive data need to be stored every display list for each tile, a lot of memory storage spaces and a lot of memory bandwidths are used.

For example, a screen having the resolution of 1280*1024 is divided into 5120 tiles configured of 16×16 pixels. In this case, in the case of a primitive covering the entire screen, the primitive data need to be stored every display list for all tiles. If 8 bites for storing each primitive data are required, a total of primitive data to be stored becomes 5120*8=41 Kbyte. In this case, since the memory storage space and the memory bandwidth are largely influenced, the performance of the 3D graphic processing apparatus is also deteriorated.

Accordingly, during the 3D graphic processing, from the viewpoint of the memory storage space and the memory bandwidth, a method capable of more efficiently processing the 3D graphic is required.

SUMMARY OF THE INVENTION

The present invention has been made in an effort to provide graphic processing method and apparatus capable of generating a display list having one tree structure for a plurality of tiles and performing a tile-based rendering by using the generated display list.

Additional aspects and/or advantages of the invention will be set forth in part in the description which follows and, in part, will be obvious from the description, or may be learned by practice of the invention.

An exemplary embodiment of the present invention provides a graphic processing method, including: receiving an image divided into a plurality of primitives; and generating one tree structured display list for a plurality of tiles by connecting the divided primitives with at least one next primitive to be rendered.

Another exemplary embodiment of the present invention provides a graphic processing apparatus, including: a graphic processor receiving an image divided into a plurality of primitives to generate one tree structured display list for a plurality of tiles by connecting each primitive with at least one next primitive to be rendered; and a memory storing the display list.

Yet another exemplary embodiment of the present invention provides a processor-readable recording medium recording a program for executing the graphic processing method in the processor.

BRIEF DESCRIPTION OF THE DRAWINGS

These and/or other aspects and advantages of the invention will become apparent and more readily appreciated from the following description of the embodiments, taken in conjunction with the accompanying drawings of which.

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
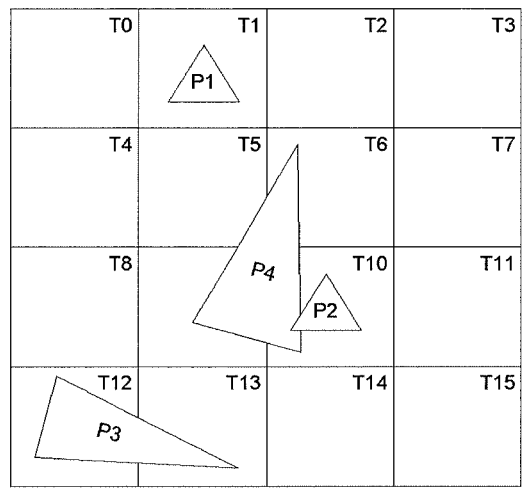
FIG. 1 is a diagram for describing a display list in a tile-based rendering.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Although a few embodiments of the present invention have been shown and described, it would be appreciated by those skilled in the art that changes may be made in this embodiment without departing from the principles and spirit of the invention, the scope of which is defined in the claims and their equivalents.

Hereinafter reference will now be made in detail to various embodiments of the present invention, examples of which are illustrated in the accompanying drawings and described below.

Primitive

A primitive means an element required for creating a graphic design such as respective lines, circles, curves, and polygons which may be actually drawn, stored and manipulated by a graphic program in a computer graphics. A graphic processing divides a surface into a plurality of basic elements, that is, the primitive. Generally, the primitive is expressed by a simple polygon such as a triangle, and described to define the vertex of the triangle.

Rendering

A rendering means a process of making an image from a model by using a computer program. Here, the model means a data structure or a description for a 3D object structured by a strongly defined language and may include geometry, time, texture mapping, illumination, shading information, and the like. The rendering may be described as a process of calculating an effect of an image editing file in order to produce a final video output matter.

Tile

A rendering apparatus performs a work of drawing a polygon from a 3D model to a 2D screen. A frame-based rendering apparatus draws the entire frame buffer at a time, but a more efficient method is a method of rendering sequentially respective tiles after dividing the screen into partial regions, that is, tiles. In the method, a scene is generally divided into tiles having a same size and shape.

Display List

A tile includes one or more polygons. Exactly, the tile includes one or more polygonal partial regions. In a tile-based rendering apparatus, it is recommended that an invisible primitive is not included in a defined tile. Accordingly, in order to perform the method, a list for each tile is prepared. The list is called a tile list, a primitive list, or a display list. The display list includes a primitive to be drawn in each region.

FIG. 1 is a diagram for describing a display list in a tile-based rendering. Referring to FIG. 1, a scene is divided into 16 equal regions, that is, tiles of T0 to T15. Each primitive is included in its tile list. For example, a tile T1 includes a primitive P1, and a tile T10 includes primitives P2 and P4 in the tile list. Overall tiles are arranged as follows.

T0={ }
T1={P1}
T2={ }, T3={ }, T4={ }, T7={ }, T8={ }, T11={ }
T5={P4}, T6={P4}, T9={P4}
T10={P4, P2}
T12={P3}, T13={P3}
T14={ }, T15={ }

Memory Bandwidth

A 3D computer graphic system needs to correspond to a request for processing a more complicated graphics. As the model is more detailed, more primitives and vertexes are required. The latest games are configured to process 100 million or more polygons per second. Accordingly, a memory bandwidth becomes a very important factor which influences the performance of the 3D computer graphic system.

Tile Group

In order to reduce an amount of a memory used for a display list, a method of making a display list for a tile group including a plurality of tiles may be used. For example, when a display list for a 4×4 tile group is generated, the sum of data to be stored by triangles which cover the entire screen is 5120/(4×4)*8=2.6 Kbyte. When a display list for a 16×16 tile group is generated, the sum of data to be stored by triangles which cover the entire screen is 5120/(16×16)*8=0.16 Kbyte.

Accordingly, in the case of a large tile covering the screen, it is advantageous that the large tile is included in the tile group including the plurality of tiles. On the contrary, in the case of a small primitive, when the small primitive is included in the tile group throughout the plurality of tiles, since the rendering needs to be processed even for a tile which does not belong to the primitive, the performance of the 3D graphic processing apparatus is deteriorated. Accordingly, it is preferred that the small primitive does not belong to the tile group throughout the plurality of tiles.

Tile Level

A tile level may be designated according to the number of tiles included in a tile group. For example, a tile group including 2×2 tiles may be designated as a level 1, and a tile group including 4×4 tiles may be designated as a level 2. However, the tile group including 4×4 tiles may be designated as a level 1, and a tile group including 16×16 tiles may be designated as a level 2.

That is, the number of tiles included in each level varies according to implementation. However, a tile group which belongs to a higher level includes more tiles.

Figure 2:
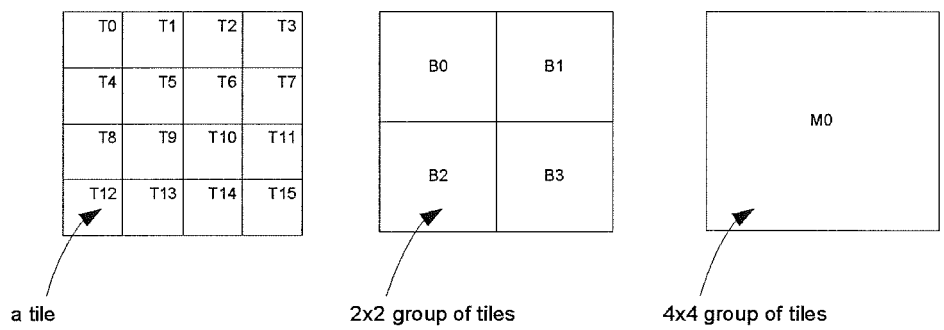
FIG. 2 is a diagram illustrating an example of a tile level.

FIG. 2 is a diagram illustrating an example of a tile level. Referring to FIG. 2, B0, B1, B2, and B3 belong to the level 1 as a tile group including 2×2 tiles. M0 belongs to the level 2 as a tile group including 4×4 tiles. A tile group including only one tile becomes a level 0.

Figure 3:
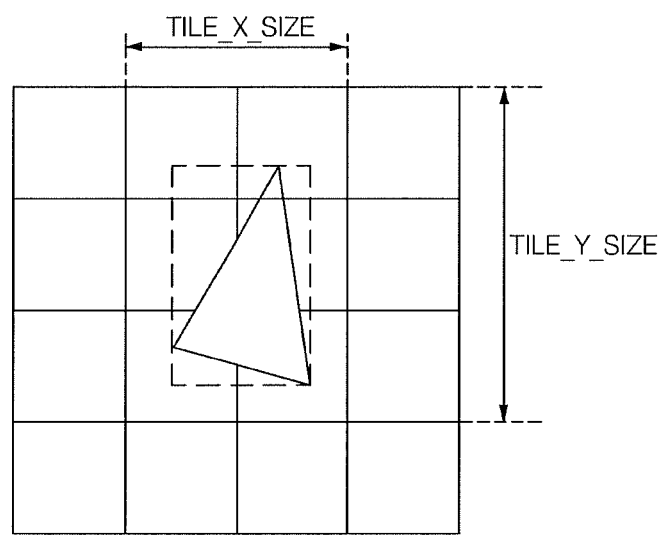
FIG. 3 is a diagram for describing a method of fitting a tile level including a primitive.

FIG. 3 is a diagram for describing a method of fitting a tile level including a primitive. That is, FIG. 3 is a diagram for describing a method of finding a tile level to which a specific node belongs.

Referring to FIG. 3, first, which tile level or which tile group a node including each primitive belongs to on a tile arrangement needs to be determined.

In the present invention, the level may be determined according to the number of tiles over a triangular bounding box. In this case, the level may be calculated by the following Equation.

$$\text{Level} = \text{ceil}(\log 2(\max(\text{TILE\_X\_SIZE}, \text{TILE\_Y\_SIZE}))) \qquad \text{[Equation 1]}$$

In FIG. 3, Equation 1 is TILE_X_SIZE=2 and TILE_Y_SIZE=3.

Accordingly, a triangle, that is, a primitive may be disposed in level=ceil(log 2(max(2,3)))=2, that is, a 4×4 tile group level.

The above method is not just applied, and another method or improvement may exist. For example, when level=level−1 is adopted, the improvement may be performed so that the number of tiles to be registered is minimized.

Figure 4:
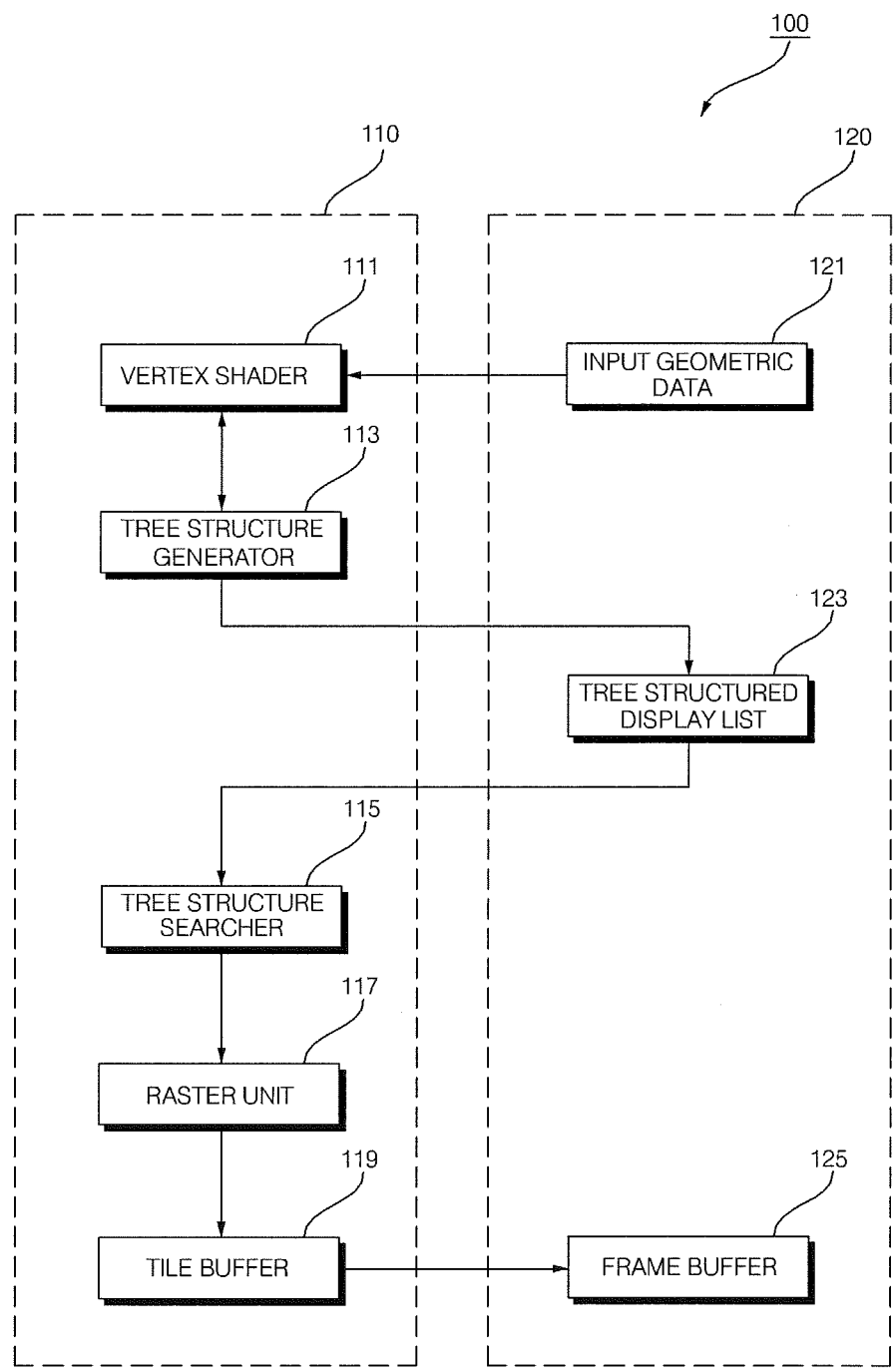
FIG. 4 is a block configuration diagram of a graphic processing apparatus according to an exemplary embodiment of the present invention.

FIG. 4 is a block configuration diagram of a graphic processing apparatus according to an exemplary embodiment of the present invention.

Referring to FIG. 4, a graphic processing apparatus 100 includes a graphic processor 110 and a memory 120.

The graphic processor 110 may include a vertex shader 111, a tree structure generator 113, a tree structure searcher 115, a raster unit 117, and a tile buffer 119. The memory 120 may include an input geometric data 121, a tree structure display list 123, and a frame buffer 125.

The input geometric data 121 is provided from an application program interface (API) operating in a host CPU. The vertex shader 111 reads the input geometric data 121 to transform the vertex. The tree structure generator 113 reads the transformed vertex data to generate the tree structure display list 123 in the memory 120.

The tree structure searcher 115 reads the tree structure display list 123 prepared in the memory 120 and visits a tree structured node to transfer a primitive included in each tile to the raster unit 117. The raster unit 117 renders image information in the tile in the tile buffer 119. When the rendering for each tile is completed, the content of the tile buffer 119 is stored in the frame buffer 125.

According to the above configuration, the tile-based rendering may be performed by using the tree structured display list.

Figure 5:
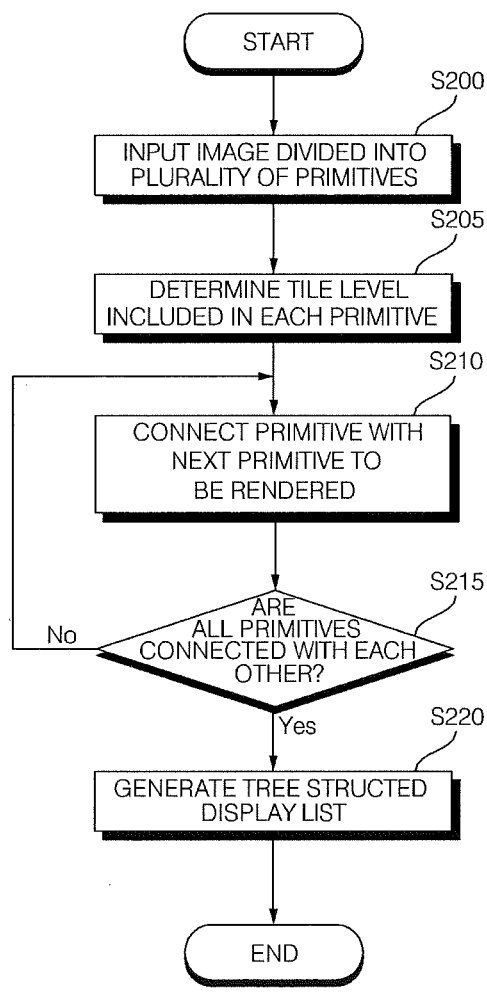
FIGS. 5 to 6 are flowcharts for describing a graphic processing method according to an exemplary embodiment of the present invention.

FIG. 5 is a flowchart for describing a process of generating a display list in a graphic processing method according to an exemplary embodiment of the present invention.

Referring to FIG. 5, the graphic processor 110 receives a 3D image divided into a plurality of primitives (S200). Next, according to the aforementioned process, the graphic processor 110 determines a tile level in which each of the divided primitives is included (S205).

The graphic processor 110 connects one or more next primitives to be rendered to each primitive (S210), and the connecting process is performed until all of the primitives are connected to each other (S215). Accordingly, all of the primitives may be connected to each other according a drawn order. In this case, each primitive has connection information for at least one next primitive to be rendered.

When the process of connecting all of the primitives is completed, a display list having a tree structure is generated (S220). The generated display list is stored in the memory 120.

In the above process, a process of generating the display list will be described in more detail as follows.

First, an image to be rendered is divided into a plurality of tiles to determine a node in which each primitive is included. In addition, a root node is determined on the tree structure. The root node may be disposed in a tile level including all tiles on the screen or including a plurality of tiles.

Next, next nodes including the primitives to be rendered are connected to the root node. The connecting process is repeated until one display list for all nodes including the primitives is generated.

By the above process, finally, a tree structured display list is generated.

Meanwhile, one of the technical features of the present invention is to induce the tile level from the connection information. That is, while the connection of the node is traced on the tree structure, which level of tile group the node including the primitive belongs to may be determined at the time of rendering. The above feature is different from a binning of preparing division corresponding to respective different tile groups and dividing and putting each primitive in each bin.

The connection information regarding the node includes information instructing whether a tile group to which the next node to be drawn belongs is at a higher level or lower level than the current tile group. What tiles the next primitive to be rendered is to be drawn on is found by using the information, and whether or to render the corresponding primitive is determined by inducing a group binning information of the tile. The rendering of the primitives may be performed according to the determining.

Figure 6:
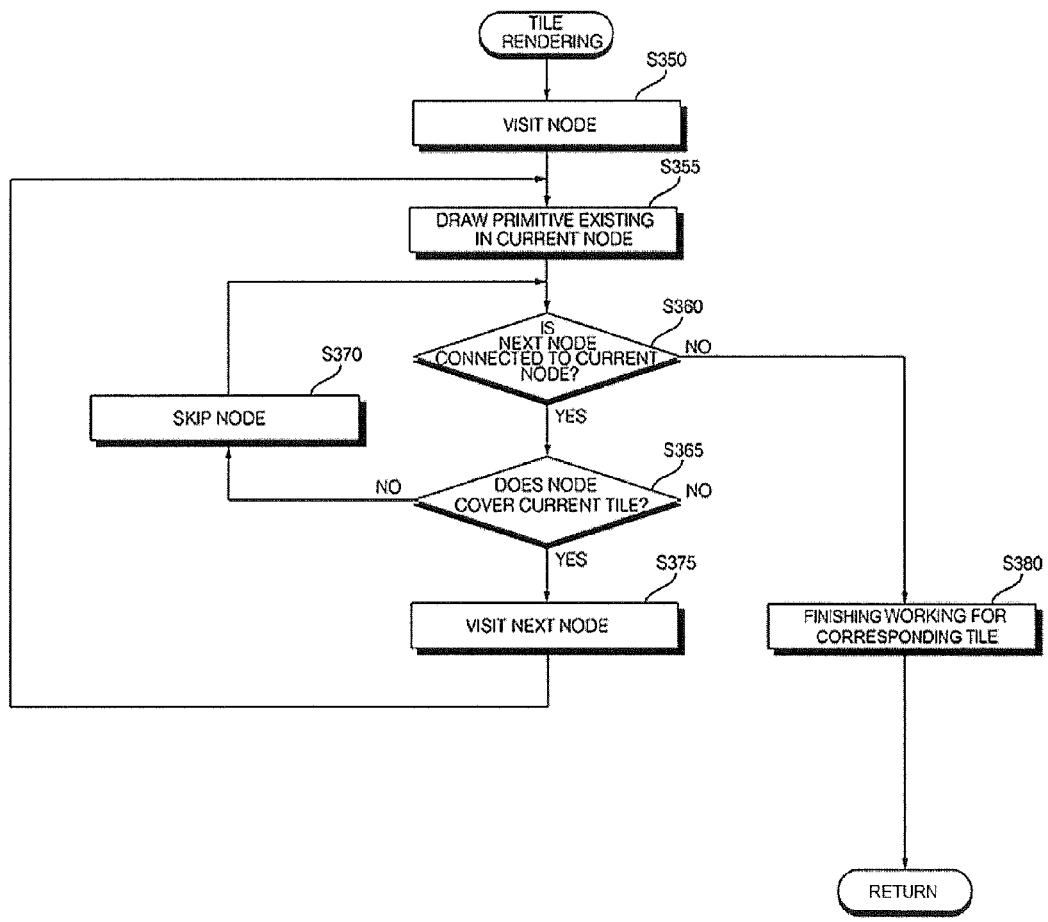

FIG. 6 is a flowchart for describing a rendering process in the graphic processing method according to the exemplary embodiment of the present invention.

The graphic processor 110 reads the tree structured display list stored in the memory 120. In addition, the graphic processor 110 performs the rendering for one tile with reference with the display list.

The graphic processor 110 checks whether a tile to be rendered exists. As the checked result, when the tile to be rendered exists, the rendering process is repetitively performed for each tile.

According to the above process, when the rendering is performed with respect to all of the tiles, the rendering process ends (S330).

FIG. 6 illustrates a process performed by the graphic processor 110 in detail. Referring to FIG. 6, the graphic processor 110 visits the current node in order to draw the current tile (S365). In the case of first starting, a root node which is a start of the tree structure is the current node.

In the case where a primitive to be rendered is included in the current node, the graphic processor 110 renders the primitive (S355). Generally, one node includes one primitive. However, one node may include a plurality of primitives or may include no primitive.

The graphic processor 110 determines whether the next node connected with the current node exists, after rendering the primitive included in the current node (S360). If the next node connected with the current node does not exist, the rendering for the tile ends (S380).

As the determined result in step S360, when the next node exists, it is judged that the connected next node is overlapped with the current tile with reference to region information for the next node (S385). As the judged result, when the next node is not overlapped with the current tile, a subsequent node is not processed but skipped (S370). In addition, by returning back to step S355, it is judged whether the next node exists (S355).

As the judged result in step S365, when the next node is overlapped with the current tile, the graphic processor 110 visits a subsequent node (S375). In addition, the process after step S355 is repetitively performed by setting the visited node as the current node.

Through the above process, while the tree structured display list is visited for each divided tile, the primitive to be rendered is rendered in the current tile. In this case, when the plurality of primitives is connected to one primitive, the process moves to a node including a primitive to be rendered based on a position of the currently drawn tile. After rendering each primitive, the rendering of the current tile is completed when reaches the last of the tree structure by repeating the visit to the node including the next primitive.

FIGS. 7 to 20 are diagrams for describing a graphic processing method according to the exemplary embodiment of the present invention. As described above, each node in the tree structure has i) connection information relating to the next node connected to the current node, ii) a reference value for the plurality of nodes connected to the current node, iii) information such as primitive data belonging to the current node or a reference value thereof, and the like.

Further, the connection information includes i) information instructing whether the connected next node belongs to an upper level or lower level of tile, ii) information instructing whether the node belongs to any sub area of the current node in the case where the connected node belongs to the lower level, and the like.

First, connection of lower nodes to the upper node will be described below.

Figure 7:
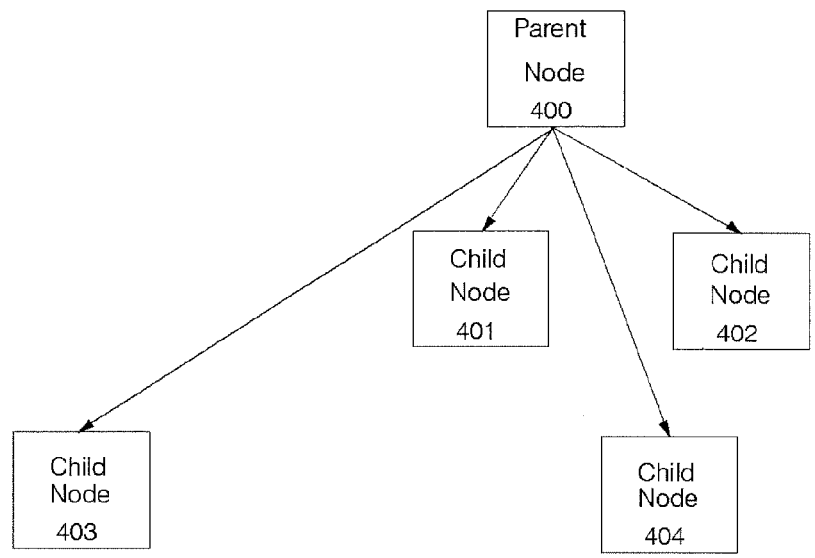
FIGS. 7 to 20 are diagrams for describing a graphic processing method according to the exemplary embodiment of the present invention.

FIG. 7 illustrates that a parent node is connected to a plurality of child nodes.

Referring to FIG. 7, a parent node 400 is connected with a plurality of child nodes 401, 402, 403, and 404. Since the parent node 400 exists in a higher level than a level of a tile group to which the lower node belongs, the parent node 400 includes an area covering tiles included in all of the child nodes 401, 402, 403, and 404. The child nodes 401, 402, 403, and 404 include sub sets among the tiles included in the parent node 400. The above structure is a structure in which the parent node 400 is first drawn and then is connected with the child nodes 401, 402, 403, and 404 to be drawn.

FIG. 7 illustrates a state in which four child nodes 401, 402, 403, and 404 are connected to the parent node 400. However, in the present invention, the number of child nodes connected to the parent node is not limited.

Figure 8:
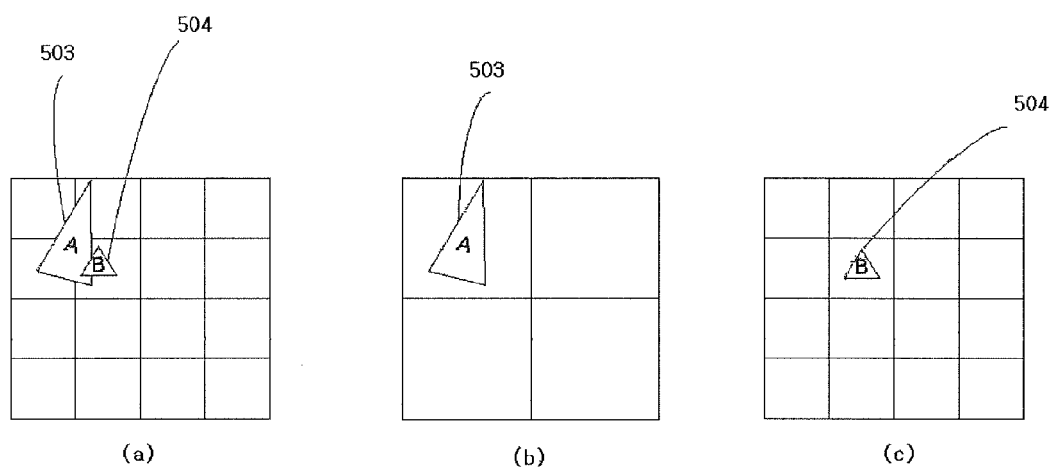

FIG. 8 illustrates an image consisting of primitives. Here, the primitives are represented by triangles.

In FIG. 8A, a primitive A 503 is first drawn and then a primitive B 504 is drawn.

FIG. 8B illustrates that a tile level to which the primitive A 503 belongs is fitted. When using [Equation 1], the tile level of the tile group to which the primitive A 503 belongs becomes a level 1. As illustrated in FIG. 8B, the tile level to which the primitive A 503 belongs includes 2×2 lower tiles.

FIG. 8C illustrates that a tile level to which the primitive B 504 belongs is fitted. When applying [Equation 1], the tile level to which the primitive B 504 belongs becomes a level 0.

Figure 9:
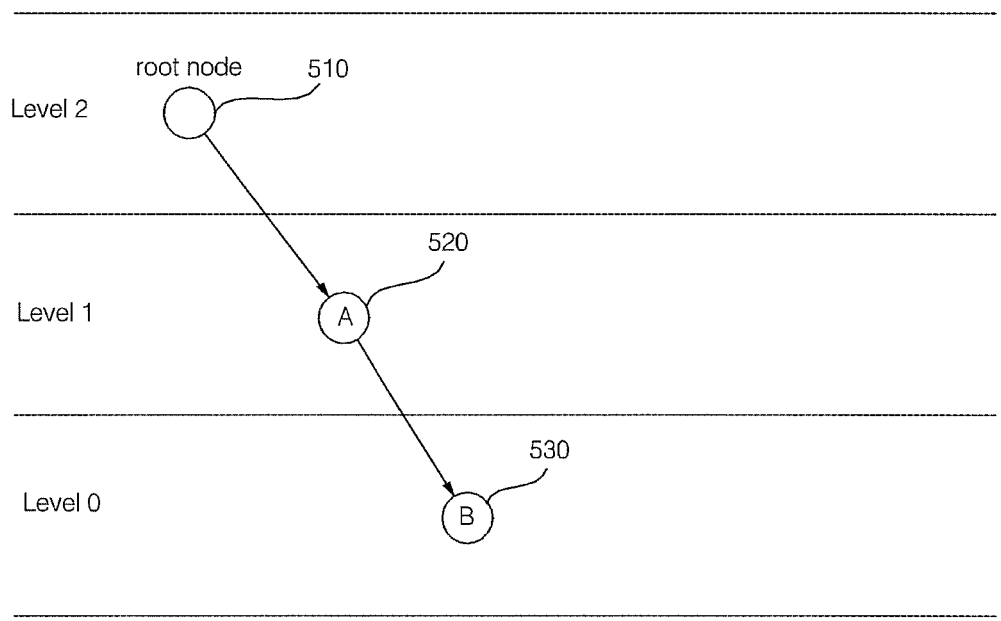

FIG. 9 illustrates that the primitive A 503 and the primitive B 504 are connected to a node structure used in the present invention. In the graphic processing method according to the present invention, a root node 510 is positioned at a level 2 which is the highest tile level. The root node 510 is connected to a child node A 520. The child node A 520 which belongs to the level 1 includes the primitive A 503. A node B 530 which belongs to the level 0 includes the primitive B 504.

In the above structure, the parent node is connected to a reference for the child node.

Figure 10:
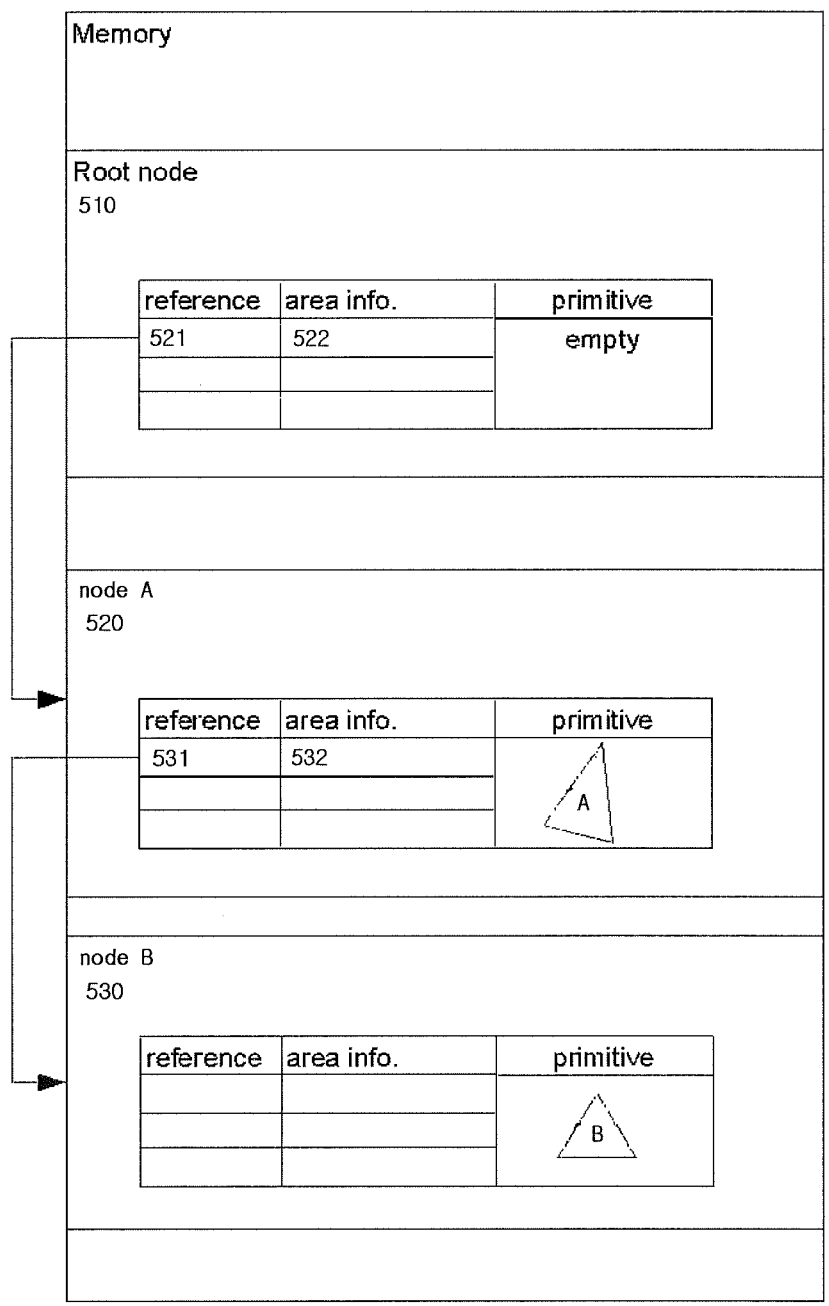

FIG. 10 illustrates a state in which a node is disposed on a memory and information included inside each node. Each node includes a reference value for another node connected to the current node, area information (area info) for the connected node, and data such as primitive data included in the current node.

FIG. 10 illustrates a case where each node refers to only one node, but in the case where more nodes are connected to each node, more reference values and more area information may be included in the node.

In FIG. 10, the node structure starts from the root node 510. The root node 510 includes a reference value 521 instructing that the next node is the node A 520. Since the primitive is not included in the root node 510, the primitive is not drawn. In addition, it is checked whether another node connected to the current node exists.

Since the reference value 521 exists, it is verified that the next node exists. By the area information 522, it may be verified where the next node is positioned among the sub sets of the current node.

The reference value 531 of the node A 520 instructs that the next node connected to the current node is the node B 530. As a result, the reference value 531 may move to the node B 530 according to the reference value 531, after rendering the primitive A which belongs to the node A 520. Similarly, the area information 532 instructs which part of the area of the node A 520 as the current node the node B 530 as the next node belongs to.

Figure 11:
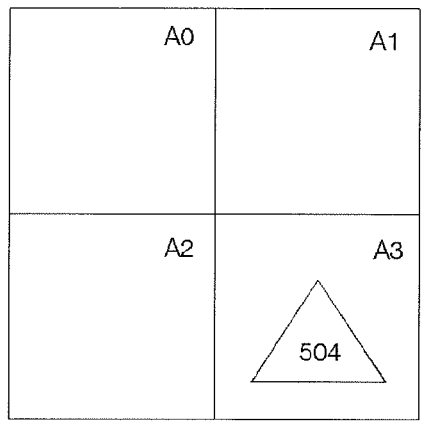

FIG. 11 illustrates the content included in the area information 532 of the node A 520 as the drawing. In FIG. 11, four partial areas represented by A0, A1, A2, and A3 are partial areas in which the child nodes connected with the parent node 520 are included, respectively.

Since the primitive B 504 is included in a child node 3, information instructing a partial area 'A3' is written in the area information 532 included in the parent node 520.

Figure 12:
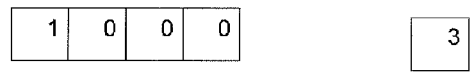

As illustrated in FIG. 12, the area information 532 may use a method of allocating 1 bit to each partial area and setting 1 in the case where the node is connected to the partial area. In this case, since the child area information 532 is connected to a third area, only a third bit is set as 1 and may be marked by 1,000 as binary numeral. As another method, the area information 532 may be marked by '3' representing the partial area 'A3'.

Figure 13:
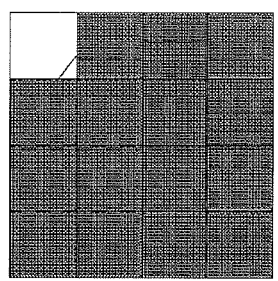
Figure 13:
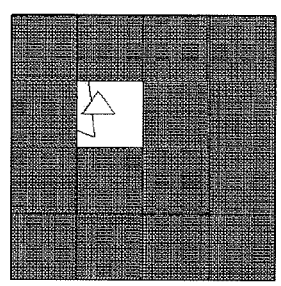

FIG. 13 is a diagram for describing a process of rendering FIG. 9.

First, in the case of a tile T0, the node A 520 as an upper node starts. Since a primitive is included in the node A 520, the primitive A 503 included in the node A is rendered. In addition, the next lower node is the node B 530, and when the area information of the node is read, it is verified that the node exists in a tile T5. Since the tile during currently processing is the T0, the tile is not overlapped with the T5. Accordingly, the node B 530 as the child node is not processed but skipped.

In addition, since the rest node except for the node B 530 is not connected to the node A 520, the rendering of the tile T0 ends. As the rendering result, the result drawn in the T0 is illustrated in FIG. 13B.

In the case of the tile T5, first, the primitive A 503 which belongs to the node A 520 is rendered. Thereafter, when the area information for the node B 530 as the child node is compared with that of the current tile T5, and the area information coincides with each other, the graphic processor 110 visits the node B 530.

When the graphic processor 110 visits the node B 530, the primitive B 504 included therein is rendered. Since another node is not connected to the node A 520, the rendering of the tile T5 ends. The rendering result of the tile T5 is illustrated in FIG. 13C.

Figure 14:
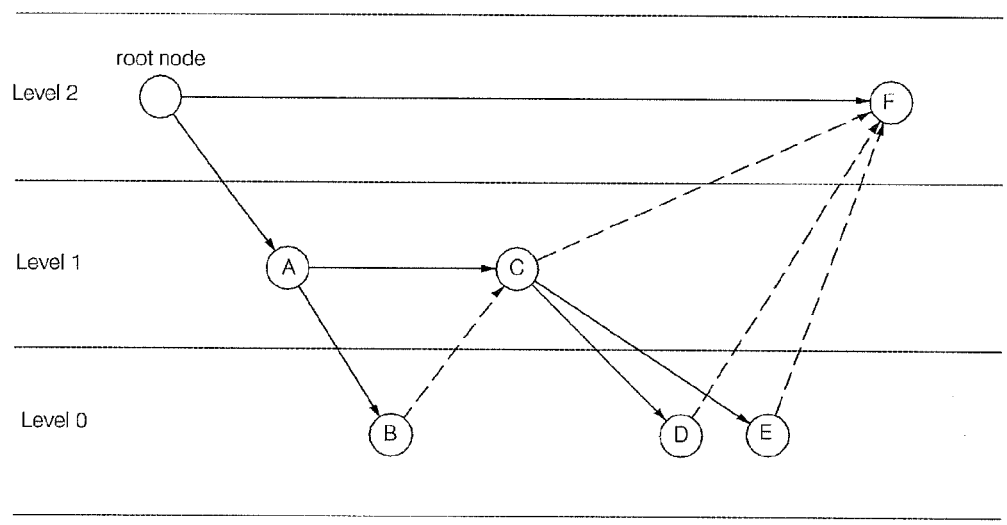

FIG. 14 illustrates an example of a node structure. FIG. 9 illustrates the structure in which the node of the upper level is connected with only the node of the upper level, but FIG. 14 illustrates a structure in which the node of the lower level is connected to the node of the upper level. A portion where the lower level is connected to the upper level is marked by dotted lines in FIG. 14. FIG. 14 is to connect the drawing in FIG. 15 as the node structure. The drawing order of the primitive is A→B→C→D→E→F.

Figure 15:
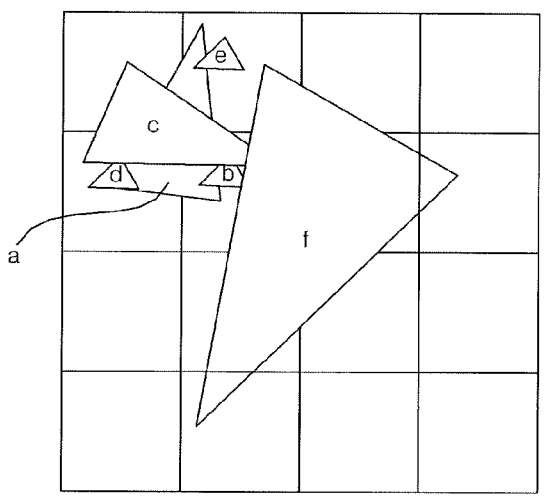
Figure 16A:
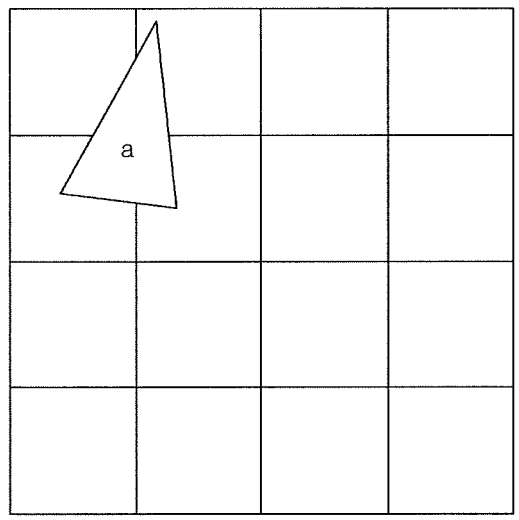
Figure 16B:
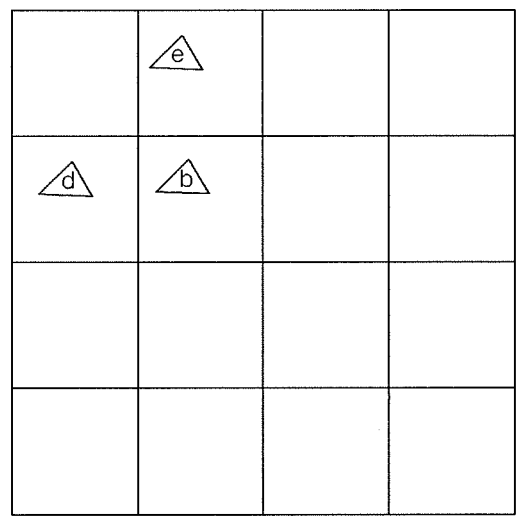
Figure 16C:
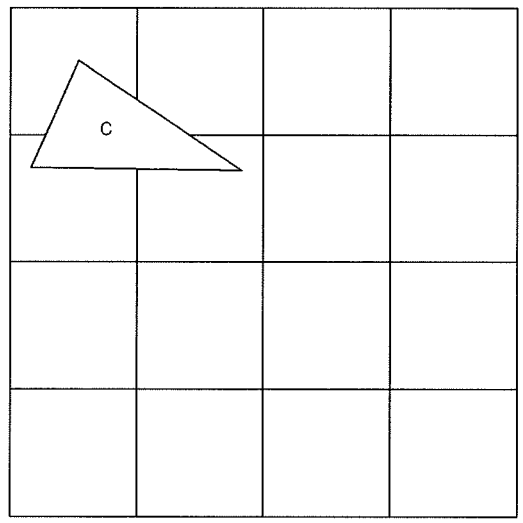
Figure 16D:
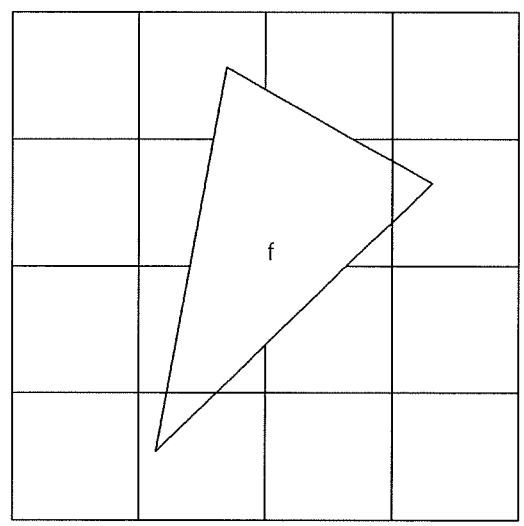

The node structure of FIG. 14 may be generated from an image of FIG. 15. Positions on the tile for respective primitives are as illustrated in FIGS. 16A to 16B.

Referring to a tree structure illustrated in FIG. 14, since a primitive which is drawn next the root node is A, the node A is connected to the root node. Since the A exists in the upper left area (A0 in FIG. 11) among four divided areas of the root node, information that the A exists in the upper left area among the four divided areas is written in the root node.

The node B is connected to the node A. In this case, the area information for the B which belongs to the lower right area (A3 in FIG. 11) among four divided areas of the A is written in the A.

The node C is connected to the node A. In this case, since the node C is the same as the tile level including the node A, the area information is not written in the connection information. Alternately, information instructing the same tile level is written in the connection information.

The node C needs to be connected to the node B, but since the tile group to which the node B belongs is the level 0 and the tile group to which the node C belongs is the level 1, information that the tile needs to move up one level when moving to the node C is written in the connection information.

The nodes D and E are connected as the child nodes D and E of the parent node C. Since the nodes D and E are the child nodes, child connection information is written in the connection information. Finally, since the node F is positioned at the tile level 2 including all of the nodes C, D, and E, the connection information to the node F is written in the nodes C, D, and E. The entire scene is generated by one tree structure by connecting up to the node F.

Next, the rendering through a node visiting will be described below.

Figure 17:
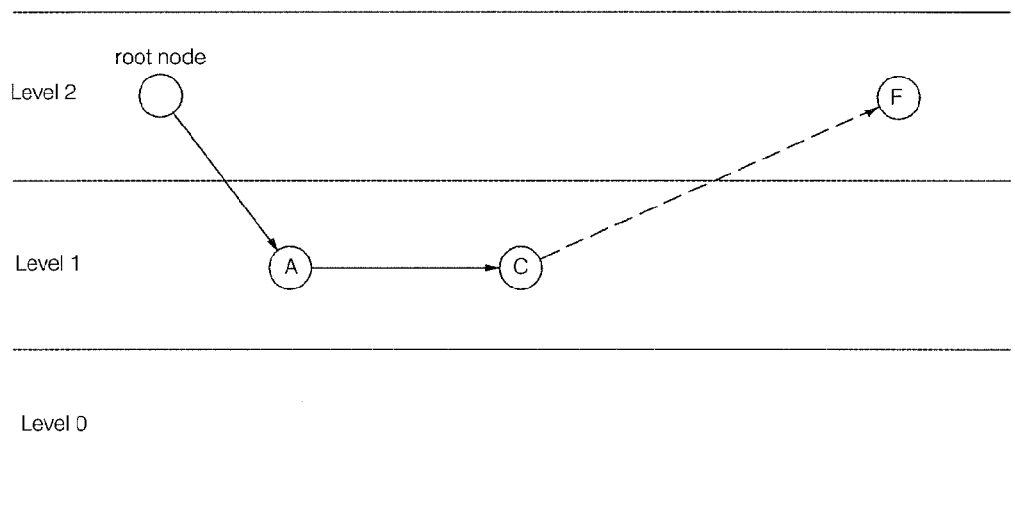

FIG. 17 illustrates a process of searching a node when rendering the tile T0. This process will be described with reference to the positions T0 to T15 illustrated in FIG. 13A. In the case of rendering the tile T0, since the node A connected to the root node includes the currently processing tile T0, a primitive a therein is drawn by moving to the node A. Since the node B is included in the tile T5, the node B is not overlapped with the tile T0. Accordingly, the node B is not processed but skipped.

The node A checks the node C which is connected next, and since the node C is overlapped with the tile T0, the graphic processor 110 visits the node C. In addition, a primitive c included in the node C is drawn. Three nodes D, E, and F are connected to the node C, and since the tile to which the nodes D and E belong is not the T0, the nodes D and E are skipped. The node C checks the node F which is connected next. Since no node is connected to the node F, the rendering of the tile T0 ends.

Figure 18:
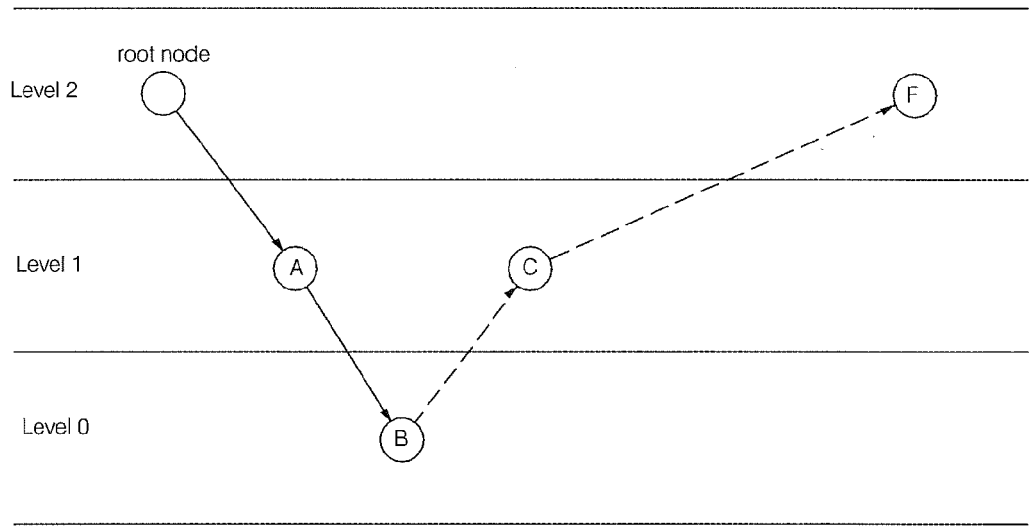

FIG. 18 illustrates a node visiting order for a tile T5. Since the node B is included in the tile T5, the graphic processor 110 visits from the node A to the node B. Since the next connected node C includes the tile T6, the graphic processor 110 visits the node C. Since the node F includes the tile T5, the graphic processor 110 visits the node F.

Whenever visiting each node in the above process, the rendering for the primitives included in the nodes is performed.

Figures 19, 20:
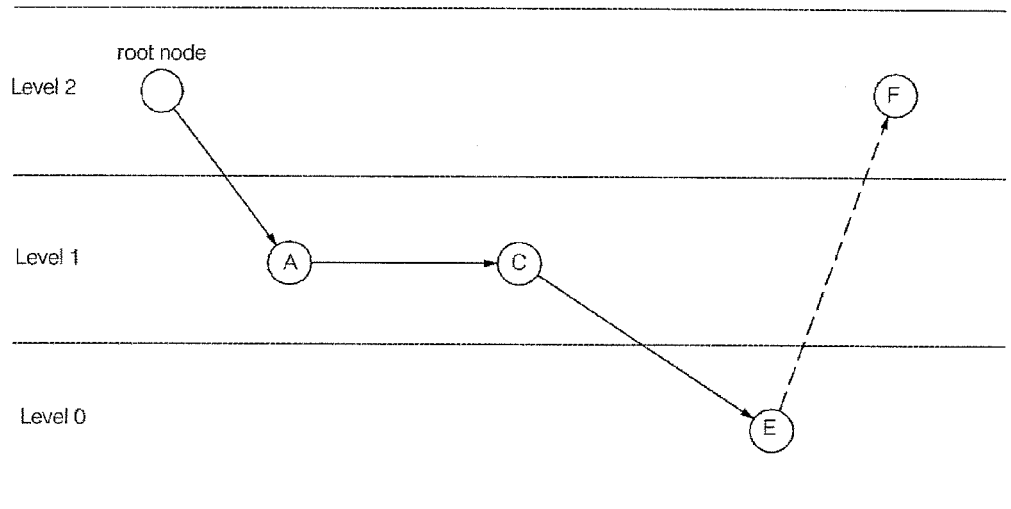

FIG. 19 illustrates a process of visiting the tile T1. The process starts from the root node. Since the node A includes the tile T1, the graphic processor 110 visits the node A. In addition, since the lower node which belongs to the tile T1 does not exist in the node A, the graphic processor 110 visits the node C. Since the node E connected to the node C includes the tile T1, the graphic processor 110 visits the node E. Since the node F includes the tile T1 during currently processing, the graphic processor 110 visits the node F. Whenever visiting each node in the above process, the rendering for the primitive included in each node is performed.

Meanwhile, in the exemplary embodiment, the entire scene is generated to one tree structure, and the root node is designated as the tile level corresponding to the entire screen. However, the entire scene may be divided into several lower areas, and each tree structured display list for each lower area may be generated. In this case, the root node is positioned at the highest tile level among the respective lower areas.

Further, in the above exemplary embodiment, the node F is connected to the nodes C, D, and E and the root node. However, the connection causes the memory bandwidth to be increased due to duplication of the reference because data for several references are written in the memory.

In order to prevent the duplication of the reference, the reference value for the node F may be stored in only the node C. In this case, the nodes D and E should store only information that the reference value for the node F is stored in the node C.

Further, the nodes D and E may store only information that the reference value for the node F is stored in the root node which is the parent node of two upper steps. That is, the reference value for the node F may be stored only in the root node. In this case, the node C may store only information that the reference value for the node F is stored in the root node which is the parent node of one upper step.

As such, the reference value for the node F is written in the memory only one time, such that it is possible to reduce the entire memory usage amount. Further, the data required for the node reference is stored in only one node, such that it is possible to reduce the entire memory usage amount.

In general, the reference for the next node may be represented by a 32-bit address on the memory. If the position for the next node is represented by a relative offset for the current node, it is possible to reduce the amount of the memory used for the reference. The position of the next primitive block which is not 32 bits may be stored by a difference value for the current primitive block, that is, offset. Accordingly, an address of the next connected node may be determined from the address of the current connected node.

As illustrated in FIG. 20, when a 1 bit flag which is a node bit representing whether an offset mode is used and 7-bit data representing the offset are used, a node existing in a 128 data offset may be referred. In the case of a large offset which is not represented by the 7-bit offset mode, the 32-bit address is used.

However, since most of the nodes are close to the current node, it is possible to reduce the amount of the memory used for the reference. This reduces the memory bandwidth. In the present invention, the 7-bit offset is exemplified, but smaller offset bits may be allocated according to an implementation.

Further, the present invention is not limited only to reduce the memory usage amount of the display list, but the present invention may be used for improving the performance by using a plurality of processing apparatuses. In a method of using the processing apparatuses, the primitives are divided into several groups, and the divided primitive groups are allocated to each node. In addition, the node generated as described above is connected to the node structure, and the connected nodes may be sequentially performed by the rendering process.

Meanwhile, the contents of the present invention are not limited only to hardware or software, but may be applied to anther computing or processing environment. The present invention may be implemented by the hardware, the software, or a combination of the hardware and software described above. The present invention may be implemented by using a circuit. That is, The present invention may be implemented by one or more programmable logic circuits (that is, an application specific integrated circuit (ASIC) or logic circuits (AND, OR, NAND gates)) or a processing apparatus (for example, microprocessor and controller).

The present invention may be implemented by a computer program on a programmable computer. The computer may include a processor, a storing device, an input device, and an output device. In order to implement the contents described in the present invention, a program code may be input by a mouse or a keyboard input device. The programs may be implemented by high-level languages or object-oriented languages. Further, the programs may be implemented by a computer system implemented by assembly or machine language code.

According to the exemplary embodiments of the present invention, since a display list having one tree structure for the entire screen or a plurality of tiles can be generated without preparing a display list for each tile, the present invention is efficient from the viewpoint of a storage space and a memory bandwidth.

Further, by performing a tile-based rendering, an amount of data stored in a display list of each tile can be reduced and particularly, it is very useful when a primitive covers the entire screen.

As such, it is possible to improve the performance of a 3D graphic processing apparatus by reducing the amount of the data.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A graphic processing method, comprising:
receiving image data including a plurality of primitives which are arranged in sequence to be rendered;
determining a tile level to which a primitive belongs and generating a node corresponding to the primitive;
setting a root node as a tile level including a plurality of tiles;
generating one tree structured display list for the plurality of tiles by hierarchically connecting a next node corresponding to a next primitive to be rendered based on the root node according to a tile level of the next node; and
rendering each tile with reference to the tree structured display list, wherein rendering a tile includes traversing the nodes of the tree structured display list in the sequence of the arranged primitives corresponding to the nodes, and for each node, using a raster unit to render the corresponding primitive if a region of the node is determined to overlap with the tile.

2. The graphic processing method of claim 1, wherein the display list includes connection information for the next primitive to be rendered.

3. The graphic processing method of claim 2, wherein the connection information includes information on a tile group to which the next primitive to be rendered belongs.

4. The graphic processing method of claim 3, wherein the information on the tile group to which the primitive belongs is induced from the connection information.

5. The graphic processing method of claim 4, wherein each node includes a reference value for connection with another node.

6. The graphic processing method of claim 5, wherein when each node is connected to another node, a reference value stored in an upper node of at least one upper step is referred.

7. The graphic processing method of claim 6, wherein the reference value includes a relative address for a previous node, and a flag for setting a relative address or an absolute address.

8. A non-transitory computer readable medium having executable programming instructions stored therein, the executable programming instructions comprising: executing the graphic processing method of claim 1 in a processor.

9. A graphic processing apparatus, comprising:
a graphic processor configured to receive image data including a plurality of primitives which are arranged in sequence to be rendered, determine a tile level to which a primitive belongs and generating a node corresponding to the primitive, set a root node as a tile level including a plurality of tiles, generate one tree structured display list for the plurality of tiles by hierarchically connecting a next node corresponding to a next primitive to be rendered based on the root node according to a tile level of the next node, and render each tile with reference to the tree structured display list, wherein rendering a tile includes traversing the nodes of the tree structured display list in the sequence of the arranged primitives corresponding to the nodes, and for each node, using a raster unit to render the corresponding primitive if a region of the node is determined to overlap with the tile; and
a memory configured to store the display list.

10. The graphic processing apparatus of claim 9, wherein the graphic processor includes a tree structure generator configured to generate the tree structured display list; and
a tree structure searcher configured to search the display list to transfer a primitive included in each tile to a means for the rendering.

11. The graphic processing apparatus of claim 9, wherein the display list includes connection information on the next primitive to be rendered.

12. The graphic processing apparatus of claim 11, wherein the connection information includes information on a tile group to which the next primitive to be rendered belongs.

13. The graphic processing apparatus of claim 12, wherein the information on the tile group to which the primitive belongs is induced from the connection information.

14. A 3D graphic processor including the graphic processing apparatus of claim 9.

* * * * *